(12) United States Patent
Cyr et al.

(10) Patent No.: US 11,041,734 B2
(45) Date of Patent: Jun. 22, 2021

(54) SYSTEMS AND METHODS FOR OPTIMIZING A TRAVEL ROUTE OF A HYBRID-ELECTRIC VEHICLE INSIDE AN EMISSIONS-FREE ZONE

(71) Applicant: Ford Global Technologies, LLC, Dearborn, MI (US)

(72) Inventors: Steven Cyr, Lake Orion, MI (US); Michael Reibling, Sterling Heights, MI (US); Bo Wu, Northville, MI (US); Ray Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 16/295,162

(22) Filed: Mar. 7, 2019

(65) Prior Publication Data
US 2020/0284599 A1    Sep. 10, 2020

(51) Int. Cl.
*G01C 21/34* (2006.01)
*G01C 21/00* (2006.01)
*B60L 11/18* (2006.01)
*B60W 20/00* (2016.01)

(52) U.S. Cl.
CPC ..... *G01C 21/3469* (2013.01); *G01C 21/3438* (2013.01)

(58) Field of Classification Search
CPC ........ G01C 21/34; G01C 21/00; G01C 22/00; B60W 20/00; B60W 20/16; B60W 30/14; B60L 11/18; H02J 7/00
See application file for complete search history.

(56) References Cited

U.S. PATENT DOCUMENTS

| | | | |
|---|---|---|---|
| 8,880,333 B2* | 11/2014 | Calkins | G01C 21/3469 701/410 |
| 9,285,240 B2 | 3/2016 | Yenamandra et al. | |
| 9,377,314 B2* | 6/2016 | Tseng | G01C 21/26 |
| 9,469,289 B2* | 10/2016 | Yu | B60W 20/12 |
| 9,994,120 B2* | 6/2018 | Yu | B60L 50/15 |

(Continued)

OTHER PUBLICATIONS

Barco, et al., "Optimal Routing and Scheduling of Charge for Electric Vehicles: Case Study," Mathematical Problems in Engineering, 2017, pp. 1-21. DOI: 10.1155/2017/8509783.

*Primary Examiner* — Yuri Kan
(74) *Attorney, Agent, or Firm* — Brandon Hicks; Eversheds Sutherland (US) LLP

(57) ABSTRACT

This disclosure is generally directed to systems and methods for optimizing a travel route of a hybrid-electric vehicle inside an emissions-free zone. In one exemplary embodiment, a travel route optimization system can be used to determine a charge level of a battery in the hybrid-electric vehicle and to locate charging stations inside and/or outside the emissions-free zone. The charge level provides an indication of a distance that the hybrid-electric vehicle can travel before a gasoline engine is started. The system can use factors such as the location of the charging stations and the charge level of the battery to generate an optimized travel route for the hybrid-electric vehicle that eliminates starting of the gasoline engine inside the emissions-free zone. The optimized travel route may be updated in real-time so as to allow recharging of the battery on an as-needed basis at a charging station inside or outside the emissions-free zone.

20 Claims, 5 Drawing Sheets

(56) References Cited

U.S. PATENT DOCUMENTS

| | | | |
|---|---|---|---|
| 10,000,129 B2* | 6/2018 | Dunlap | B60L 11/1816 |
| 2012/0290149 A1* | 11/2012 | Kristinsson | B60W 20/12 |
| | | | 701/2 |
| 2014/0021908 A1* | 1/2014 | McCool | H02J 7/02 |
| | | | 320/108 |
| 2015/0151648 A1* | 6/2015 | Przybylski | B60W 50/14 |
| | | | 701/2 |
| 2016/0332623 A1* | 11/2016 | Baverstock | B60R 16/0236 |
| 2018/0143639 A1 | 5/2018 | Singhal et al. | |
| 2019/0126907 A1* | 5/2019 | Park | B60W 10/26 |
| 2019/0390970 A1* | 12/2019 | Cha | B60W 20/13 |

\* cited by examiner

SYSTEMS AND METHODS FOR OPTIMIZING A TRAVEL ROUTE OF A HYBRID-ELECTRIC VEHICLE INSIDE AN EMISSIONS-FREE ZONE

FIELD OF THE DISCLOSURE

This disclosure generally relates to automobiles, and more particularly relates to hybrid-electric vehicles.

BACKGROUND

Gasoline-operated vehicles have been around for many years, and people have grown accustomed to using them for traveling long distances. Infrastructure for supporting the use of gasoline-operated vehicles has also been in place for many years. However, in recent years, people have begun to recognize the harmful effects of gasoline emissions and have started to use alternative forms of transport such as electric vehicles and hydrogen vehicles so as to avoid harmful emissions into the atmosphere.

The driving range of an electric vehicle is dependent on several factors such as battery technology, battery usage efficiency, and vehicle weight. Battery technology is being improved year after year, and the range of travel obtained by electric vehicles is also increasing correspondingly. Hand in hand with developmental efforts related to batteries and electric vehicles, attention is also being paid to providing infrastructure that can support the use of electric vehicles. Commercial establishments such as hotels and airports are beginning to provide charging stations where an electric vehicle can be charged conveniently and easily. Some municipalities are designating certain areas as emissions-free zones where it is against the law to operate a vehicle having a gasoline engine.

Car manufacturers are also doing their share in trying to help customers transition from gasoline-operated vehicles to electric vehicles. Towards this end, some car manufacturers have opted to take a two-step approach by manufacturing hybrid-electric vehicles while waiting on improvements in battery technologies that would make electric vehicles more attractive to customers. A hybrid-electric vehicle generally incorporates a gasoline engine as well as an electric motor. Typically, the hybrid-electric vehicle first uses a battery for operating the electric motor to move the hybrid-electric vehicle. The gasoline engine comes into play when the battery is drained to a point where it can no longer operate the motor. The battery may be automatically recharged by the use of a generator that is powered by the gasoline engine. When recharged adequately, the battery is brought back into service to operate the motor. Supplementing the use of a battery with a gasoline engine is a trade-off that provides certain advantages in terms of long-distance driving but fails to fully eliminate harmful emissions into the atmosphere. Furthermore, a driver of a hybrid-electric vehicle may avoid driving through an emissions-free zone for fear of the gasoline engine starting up and instead opt to drive around the emissions-free zone, thereby leading to a longer drive and more emissions into the atmosphere. It is therefore desirable to provide solutions that at least address the use of hybrid-electric vehicles inside emissions-free zones.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
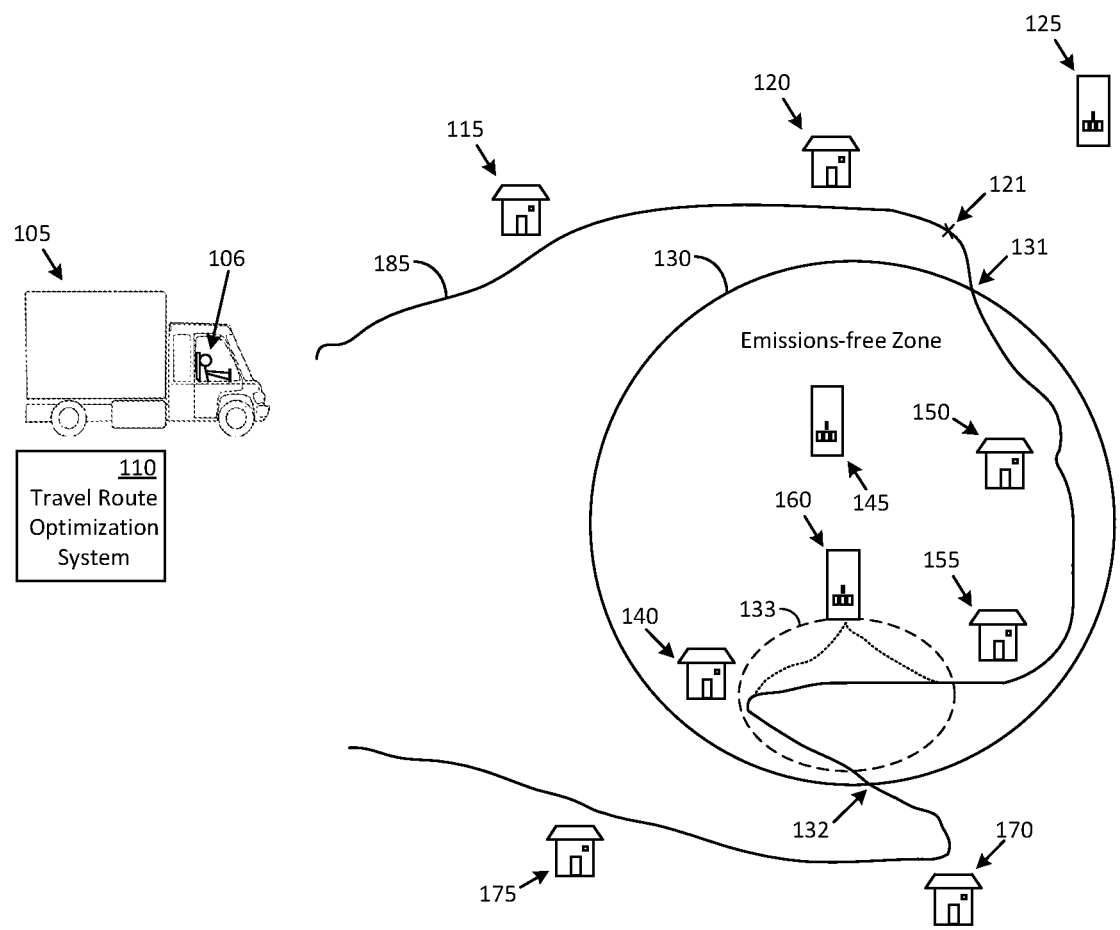
FIG. 1 illustrates a first exemplary scenario pertaining to a travel route of a hybrid-electric vehicle in an emissions-free zone in accordance with the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "automobile" and "vehicle" can be used interchangeably. The phrase "emissions-free zone" as used herein should be generally understood as equivalent to other phrases such as "electric-vehicle (EV) only zone," "low-emission zone," "zero-emissions zone," and "clean air zone." Such zones may completely or at least partially ban entry and operation of gasoline-operated vehicles. Words such as "delivery and "deliveries" are merely examples of some operations that can be carried out by a hybrid-electric vehicle in accordance with the disclosure. Other operations can include "pickup" and "drop-off" of packages or people, for example. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods for optimizing a travel route of a hybrid-electric vehicle inside an emissions-free zone. In one exemplary embodiment, a travel route optimization system can be used to identify various charging stations located inside the emissions-free zone and/or in a vicinity outside the emissions-free zone. The system can be also used to determine a charge level of a battery in the hybrid-electric vehicle at any given instant in time. The charge level provides an indication of a distance that the hybrid-electric vehicle can travel before a gasoline engine of the hybrid-electric vehicle starts automatically. The system can then be used to generate an optimized travel route of the hybrid-electric vehicle inside the emissions-free zone based on factors such as the charge level of the battery and the location of the various charging stations. The optimized travel route, which is configured to eliminate starting of the gasoline engine inside the emissions-free zone, may be updated in real-time so as to allow recharging of the battery on an as-needed basis at a charging station located close to the optimized travel route. In one exemplary situation, the hybrid-electric vehicle may encounter a delay due to an accident, and an update of the travel route may necessitate a recharging of the battery at a charging station located near the travel route inside the emissions-free zone. In another exemplary situation, the hybrid-electric vehicle may encounter a delay due to an accident, and an update of the travel route may necessitate exiting the emissions-free zone in order to recharge the battery at a charging station located outside the emissions-free zone.

FIG. 1 illustrates a first exemplary scenario where a travel route optimization system 110 can be used to generate a travel route for a hybrid-electric vehicle 105 inside an emissions-free zone 130 in accordance with the disclosure. The hybrid-electric vehicle 105 includes a gasoline engine and a battery-driven electric motor. Typically, the hybrid-electric vehicle 105 is operated initially by using the battery-driven electric motor. When a charge level of the battery is depleted and can no longer activate the electric motor, the gasoline engine starts up automatically. Upon starting up, the gasoline engine can be used to move the hybrid-electric vehicle 105 as well as to recharge the battery. When charged adequately, the gasoline engine stops operating, and the battery is automatically reconnected to the electric motor for moving the hybrid-electric vehicle 105.

The emissions-free zone 130 is a designated area where it may be improper or illegal to operate an automotive gasoline engine. However, operation of an electric vehicle is permitted inside the emissions-free zone 130, and it is therefore acceptable to drive the hybrid-electric vehicle 105 inside the emissions-free zone 130 by using only the electric motor. The gasoline engine of the hybrid-electric vehicle 105 should not be operated inside the emissions-free zone 130.

In one exemplary embodiment, the hybrid-electric vehicle 105 is a driver-operated vehicle, and the travel route optimization system 110 is configured to assist the driver 106 in following a travel route through the emissions-free zone 130 without the gasoline engine being activated. In this exemplary embodiment, the travel route optimization system 110 can be incorporated into a device that is carried by the driver 106 and/or can be incorporated into a device such as a Global Positioning System (GPS) apparatus that is located in the hybrid-electric vehicle 105. For example, the travel route optimization system 110 can be provided in the form of an application in a smartphone carried by the driver 106 or can be stored as a computer program in a memory chip of the GPS apparatus.

The driver of the hybrid-electric vehicle 105 can be, for example, a delivery person such as a FEDEX® employee or a pizza delivery person who uses the hybrid-electric vehicle 105 to deliver various articles to customers. Some of the customers may be located outside the emissions-free zone 130, and others may be located inside the emissions-free zone 130. The delivery person may opt to use (or may be instructed to use) a delivery route 185 for reaching the various customers. In this example, the delivery route 185 includes a first section that is located outside the emissions-free zone 130, a second section that is located inside the emissions-free zone 130, and a third section that is also located outside the emissions-free zone 130.

The hybrid-electric vehicle 105 may be operated in the first section and the third section of the delivery route 185 in a hybrid mode of operation where the battery as well as the gasoline engine in the hybrid-electric vehicle 105 can be used. However, it would be improper or illegal to operate the gasoline engine of the hybrid-electric vehicle 105 when driving in the second section of the delivery route 185 located inside the emissions-free zone 130. Consequently, in one exemplary implementation, the driver 106 assesses the charge level available in the battery of the hybrid-electric vehicle 105 after delivering articles at a first customer site 115 and a second customer site 120. At this time, the hybrid-electric vehicle 105 can be at a location 121 along the delivery route 185 prior to an entry point 131 into the emissions-free zone 130. In one exemplary situation, the charge level available in the battery of the hybrid-electric vehicle 105 indicates that the hybrid-electric vehicle 105 can be driven further over a 30-mile distance. The driver 106 may be aware that the second section of the delivery route 185 extends 50 miles and that a recharge of the battery will be required inside the emissions-free zone if the driver were to enter the emissions-free zone 130 without recharging the battery. The driver may therefore opt to recharge the battery at a charging station 125 before entering the emissions-free zone 130.

Alternatively, the driver 106 can opt to use the travel route optimization system 110 in accordance with the disclosure to detect a charge level available in the battery of the hybrid-electric vehicle 105 and to generate an optimized travel route that would allow him to drive through the emissions-free zone 130 with access to one or more charging stations for recharging the battery. The travel route optimization system 110 may generate an optimized travel route that extends from the entry point 131 into the emissions-free zone 130 and an exit point 132 out of the emissions-free zone 130. When doing so, the travel route optimization system 110 may determine that it would be sub-optimal for the driver 106 to use a charging station 145 for recharging the battery inside the emissions-free zone 130.

The optimized travel route inside the emissions-free zone 130 can include a segment 133 where the driver 106 can drive to a charging station 160 for recharging the battery before making a delivery at a customer site 140. The optimized travel route inside the segment 133 as indicated by a dashed line. Failure to use the optimized travel route for recharging at the charging station 160 can result in the battery failing to provide adequate power to operate the electric motor and can result in starting the gasoline engine in the hybrid-electric vehicle 105 inside the emissions-free zone 130.

In conformance with the optimized travel route, the driver 106 can carry out deliveries at customer site 150 and customer site 155 inside the emissions-free zone 130 and then drive to the charging station 160 prior to making the delivery at the customer site 140. The driver 106 can then exit the emissions-free zone 130 at the exit point 132 and continue with deliveries at a customer site 170 and a customer site 175 outside the emissions-free zone 130. Once outside the emissions-free zone 130, the driver 106 may choose any travel route without fear of improperly operating the gasoline engine.

In another exemplary embodiment, the hybrid-electric vehicle 105 is an autonomous vehicle, and the travel route optimization system 110 is configured to cooperate with various components of the autonomous vehicle in order to help navigate the autonomous vehicle through the emissions-free zone 130 without using the gasoline engine. The travel route optimization system 110 may be provided in the form of a computer system that is a part of an apparatus mounted in the autonomous vehicle or can be a part of a computer system that is located outside the autonomous vehicle and controls the autonomous vehicle via commands that may be transmitted to the autonomous vehicle through a communications network. The autonomous vehicle can be a delivery vehicle that is programmed to carry out deliveries at the various customer sites inside the emissions-free zone 130. Towards this end, the travel route optimization system 110 may monitor a charge level in the battery continuously or periodically, and automatically generate an optimized travel route in real-time. The travel route optimization system 110 may cooperate with an engine controller of the autonomous vehicle to configure the autonomous vehicle to follow the optimized travel route without operating the gasoline engine in the emissions-free zone 130. The delivery route 185 followed by the autonomous vehicle can be different than the delivery route 185 followed by the driver-operated vehicle. In one exemplary implementation, the delivery route 185 followed by the autonomous vehicle can be shorter than the delivery route 185 followed by the driver-operated vehicle so as to avoid having to recharge the battery of the autonomous vehicle. In another exemplary implementation, the delivery route 185 followed by the autonomous vehicle can include one or more sections that allow for recharging of the battery of the autonomous vehicle at a charging station that is specifically designed to provide charging facilities for autonomous vehicles.

Figure 2:
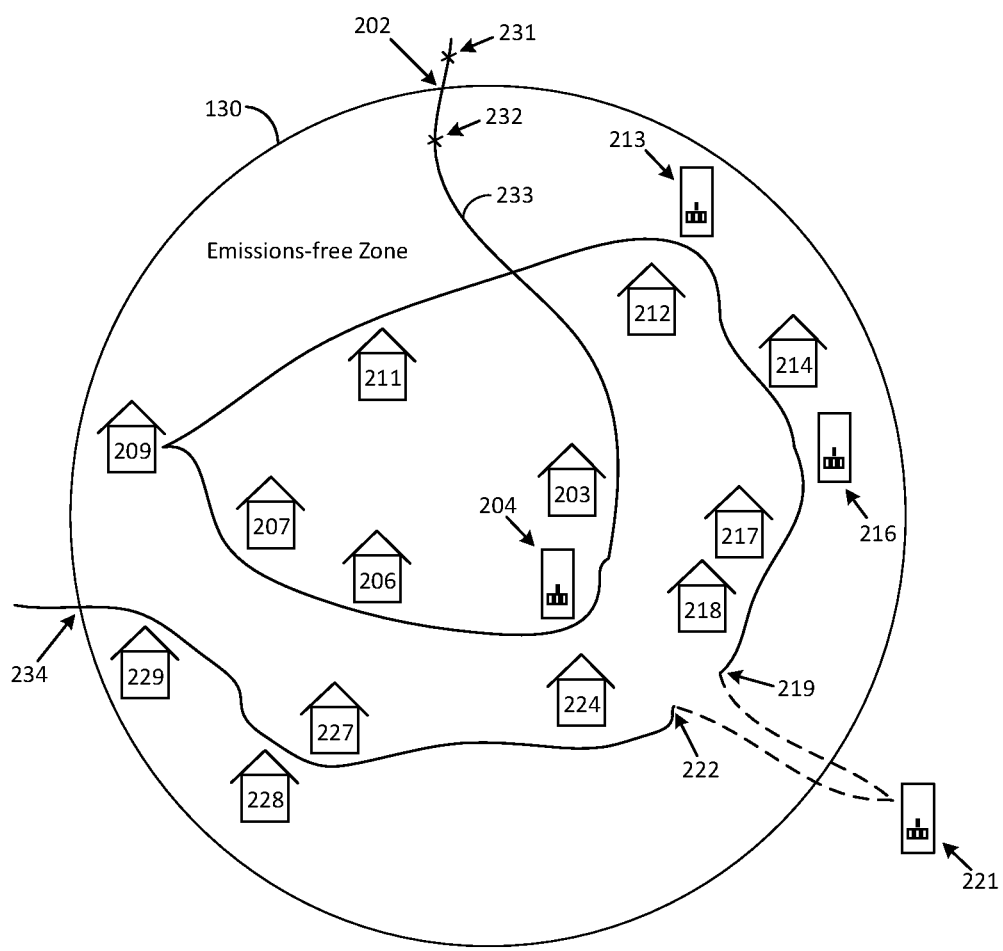
FIG. 2 illustrates a second exemplary scenario pertaining to a travel route of a hybrid-electric vehicle inside an emissions-free zone in accordance with the disclosure.

FIG. 2 illustrates a second exemplary scenario where the travel route optimization system 110 can be used to generate an optimized travel route 233 for a hybrid-electric vehicle 105 through the emissions-free zone 130. The travel route optimization system 110 may be used to generate the optimized travel route 233 when the hybrid-electric vehicle 105 is at a location 231 just prior to entering the emissions-free zone 130 at an entry point 202, or to generate the optimized travel route 233 when the hybrid-electric vehicle 105 is at a location 232 just after entering the emissions-free zone 130. The travel route optimization system 110 may assess a charge level of the battery in the hybrid-electric vehicle 105 to determine how far the hybrid-electric vehicle 105 can travel without starting the gasoline engine and use the charge level information together with, for example, a scheduled delivery routine or a scheduled delivery route of the driver 106, to generate the optimized travel route 233 through the emissions-free zone 130.

The optimized travel route 233 may offer a recommendation to the driver (or the autonomous vehicle) to first travel to a customer site 203, even though it may appear more logical to travel to a customer site 212 that appears closer to the entry point 202. The travel route optimization system 110 may take into consideration various factors such as road layout, traffic congestion, and road rules (for example, speed restrictions during certain times of the day) when determining that it would be more optimal for the hybrid-electric vehicle 105 to travel to the customer site 203 first rather than to the customer site 212.

A charging station 204 is located close to the customer site 203. Depending on the assessed charge level of the battery, the travel route optimization system 110 may either suggest recharging the battery at the charging station 204 or continuing from the customer site 203 to a customer site 206. The optimized travel route 233 can include a driving sequence for the hybrid-electric vehicle 105 to travel from the customer site 206 to a customer site 207, followed by a customer site 209, a customer site 211, and the customer site 212. The charge level of the battery may be monitored by the travel route optimization system 110 in real-time as the hybrid-electric vehicle 105 is traversing the optimized travel route 233. When the charge level has dropped below a threshold level, the travel route optimization system 110 can recommend recharging the battery at a charging station 213 that is located inside the emissions-free zone 130. In one exemplary case, the threshold level can be set by the driver 106 of the hybrid-electric vehicle 105 based on personal preference. In another exemplary case, the threshold level can be set automatically by the travel route optimization system 110 based on various factors such as the battery drain rate and the electric motor performance parameters.

A charging station 216 is located close to a customer site 214 further along the optimized travel route 233. The travel route optimization system 110 may recommend foregoing the use of the charging station 216 because the charge level of the battery is high after recharging the battery at the charging station 213. However, when making deliveries at customer site 217 and customer site 218, the hybrid-electric vehicle 105 encounters an adverse travel factor such as a traffic accident or traffic congestion that causes excessive battery drain. The travel route optimization system 110 detects the drop in the battery charge level and advises the driver 106 to exit the emissions-free zone 130 at a location 219 along the optimized travel route 233 in order to recharge the battery at a charging station 221 that is located outside the emissions-free zone 130.

In a first example scenario, the driver 106 drives the hybrid-electric vehicle 105 out of the emissions-free zone 130, recharges the battery at the charging station 221, and re-enters the emissions-free zone 130 after charging is completed. After re-entering the emissions-free zone 130, the hybrid-electric vehicle 105 rejoins the optimized travel route 233 at a location 222 before following a delivery sequence at a customer site 224, a customer site 227, a customer site 228, and a customer site 229. The hybrid-electric vehicle 105 then exits the emissions-free zone 130 at an exit point 234.

In a second example scenario, the hybrid-electric vehicle 105 is one of several vehicles in a fleet of vehicles operated by an entity such as FEDEX®. The travel route optimization system 110 provided in the hybrid-electric vehicle 105 detects the excessive battery drain after deliveries have been made at customer site 217 and customer site 218 and automatically communicates the low battery status to a server system (such as the server system 505 shown in FIG. 5). The server system, automatically and/or under control of an administrator of the fleet, instructs the driver 106 to drive the hybrid-electric vehicle 105 out of the emissions-free zone 130, recharge the battery at the charging station 221, and continue on a new delivery route that may or may not involve re-entering the emissions-free zone 130. The server system may then instruct a driver of another hybrid-electric vehicle of the fleet to enter the emissions-free zone 130 and fulfil the remaining deliveries that were originally assigned to the driver 106 of the hybrid-electric vehicle 105. The server system may also store information pertaining to this event (low-battery status, replacement trip, etc.) for optimizing future assignments and operations carried out by other hybrid-electric vehicles of the fleet inside the emissions-free zone 130.

In a third example scenario, the driver 106 of the hybrid-electric vehicle 105 discovers, after making deliveries at customer site 217 and customer site 218, that he/she is unable to complete deliveries at other customer sites inside the emissions-free zone 130 for various reasons. For example, the hybrid-electric vehicle 105 can be one of several vehicles in a fleet of vehicles delivering groceries to customers inside the emissions-free zone 130. The driver 106 may discover spoilage in the groceries due to a malfunctioning refrigerator for example, or may discover that the wrong items have been loaded onto the hybrid-electric vehicle 105. The charge level of the battery in the hybrid-electric vehicle 105 at this time is inadequate for the driver 106 to drive to a warehouse located outside the emissions-free zone 130 and return in time for completing remaining deliveries. In such a condition, the travel route optimization system 110 provided in the hybrid-electric vehicle 105 is used to communicate the low battery status to a server system (such as the server system 505 shown in FIG. 5). The server system, automatically and/or under control of an administrator of the fleet, instructs the driver 106 to drive the hybrid-electric vehicle 105 out of the emissions-free zone 130, recharge the battery at the charging station 221, and continue on a new delivery route that may or may not involve driving to the warehouse and/or re-entering the emissions-free zone 130. The server system may then instruct a driver of another hybrid-electric vehicle of the fleet to enter the emissions-free zone 130 and fulfil the remaining deliveries that were originally assigned to the driver 106 of the hybrid-electric vehicle 105. The server system may store information pertaining to this event for optimizing future assignments and operations carried out by other hybrid-electric vehicles of the fleet inside the emissions-free zone 130. The stored information may be used to avoid such occurrences in the future such as by loading additional product stock in each of the hybrid-electric vehicles of the fleet, performing periodic maintenance on equipment such as the refrigerator, adjusting delivery times, and adjusting trip distances.

Figure 3:
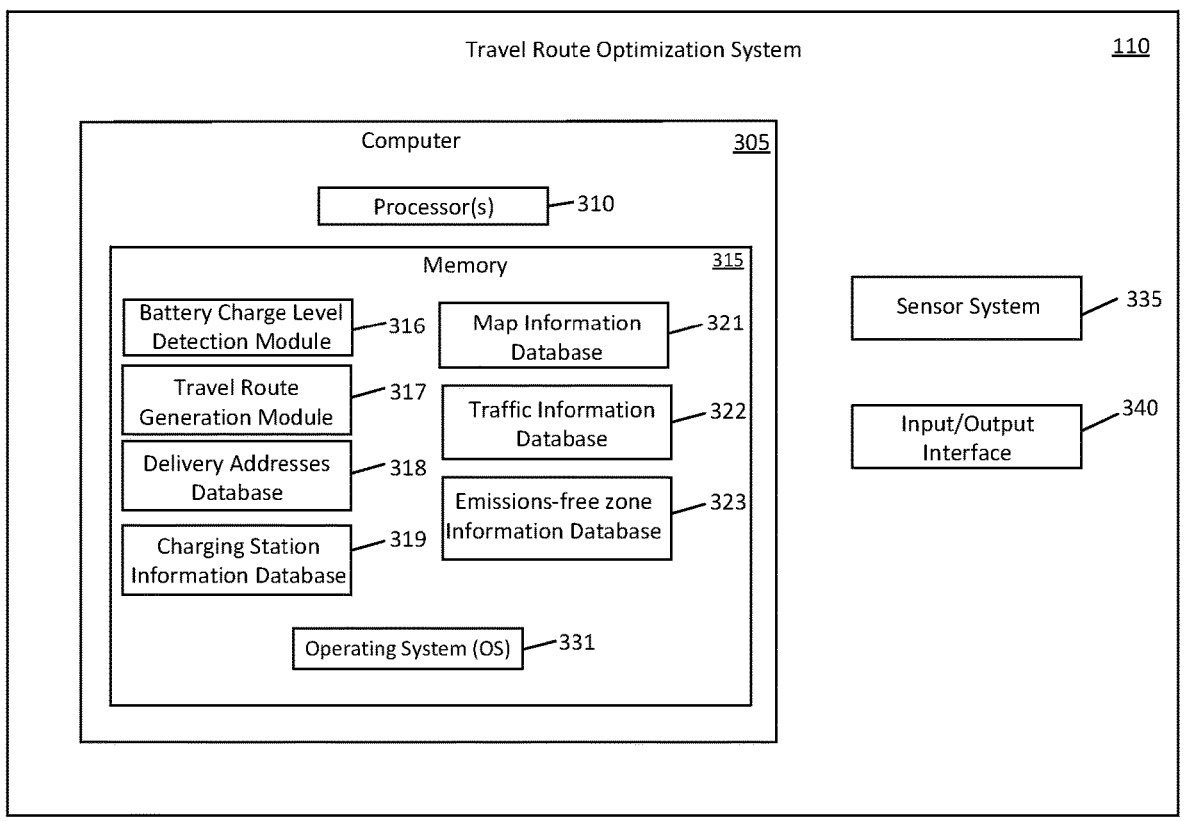
FIG. 3 shows some exemplary components of a travel route optimization system in accordance with the disclosure.

FIG. 3 shows some exemplary components of the travel route optimization system 110 in accordance with the disclosure. In this example, the travel route optimization system 110 may include several components such as a computer 305, a sensor system 335, and an input/output interface 340. The computer 305 can include a processor 310 and a memory 315. The memory 315, which is one example of a non-transitory computer-readable medium, may be used to store an operating system (OS) 331 and various other code modules and databases such as a battery charge level detection module 316, a travel route generation module 317, a delivery addresses database 318, a charging station information database 319, a map information database 321, a traffic information database 322, and an emissions-free zone information database 323.

Some or all of the code modules may be configured to use information contained in one or more of the various databases and may also cooperate with various types of hardware provided in the hybrid-electric vehicle 105 for executing various operations described herein. For example, the battery charge level detection module 316 may include software that cooperates with the sensor system 335 to determine a charge level of a battery in the hybrid-electric vehicle 105. The charge level information can then be used to generate an optimized travel route for the hybrid-electric vehicle 105 through the emissions-free zone 130. In an exemplary implementation, the sensor system 335 may include some or all of various sensors that are located in the hybrid-electric vehicle 105 for measuring a charge level of the battery and displaying battery-related information on a dashboard of the hybrid-electric vehicle 105. The sensor system 335 may also include other sensors such as a vehicle speed sensor, a battery current-draw sensor, and a battery-to-gasoline engine switchover sensor.

The input/output interface 340 can receive various types of information for use by the computer 305 and for providing output from the computer 305. In one exemplary implementation, the input/output interface 340 may include a keyboard, a keypad, or a touchscreen that the driver 106 uses to request an optimized travel route from the travel route optimization system 110 and/or to provide information to the computer 305. For example, the driver 106 may use a touchscreen of a smartphone to enter a list of delivery addresses on a delivery route. The delivery addresses can be stored in the memory 315 in the form of the delivery addresses database 318. In another example, an employee of a company that employs the driver 106 may use a keyboard of a computer to enter information about various battery charging stations. This information, which can include, for example, a location, an availability, and pricing of one or more charging stations, can be stored in the memory 315 in the form of the charging station information database 319. The employee may also enter information about the emissions-free zone 130 such as coverage area, rules, and regulations. This information can be stored in the memory 315 in the form of the emissions-free zone information database 323.

The input/output interface 340 can also be used to automatically receive various types of information from various sources and store the information in the memory 315 for use by the computer 305. For example, the input/output interface 340 can be communicatively coupled to a Global Positioning System (GPS) of the hybrid-electric vehicle 105 to automatically receive map information. The map information can be stored in the memory 315 in the form of the map information database 321. As another example, the input/output interface 340 can be communicatively coupled to a traffic monitoring service for automatically receiving information such as traffic reports and accident reports. The information can be stored in the memory 315 in the form of the traffic information database 322.

In yet another example, the driver 106 and/or an employee of a company that employs the driver 106 may use a smartphone or a computer to request an optimized travel route generated by the travel route optimization system 110. Upon receiving the request, the processor 310 executes the computer-executable instructions stored in the memory in the form of the travel route generation module 317. Some or all of the other modules and databases contained in the memory 315 may be used during the generation of the optimized travel route. The generated optimized travel route can be provided to the driver 106 and/or the employee via the input/output interface 340. In one exemplary implementation, the optimized travel route may be displayed on a display screen of a device such as a smartphone or a GPS device. The display can be provided, for example, in a graphical format (such as a map) and/or in a text format (turn-by-turn instructions).

The input/output interface 340 can include hardware such as a wireless transceiver that is configured to wirelessly communicate with various hardware elements in the hybrid-electric vehicle 105. The wireless transceiver can use various types of wireless communications such as a Bluetooth® system and/or can use a dedicated wireless link having a customized format. Alternatively, the input/output interface 340 can include hardware that allows the travel route optimization system 110 to be coupled directly to hardware elements in the hybrid-electric vehicle 105. For example, a coaxial cable may be used to couple a device such as a smartphone containing the travel route optimization system 110, to a connector of a computer system provided in the hybrid-electric vehicle 105.

Figure 4:
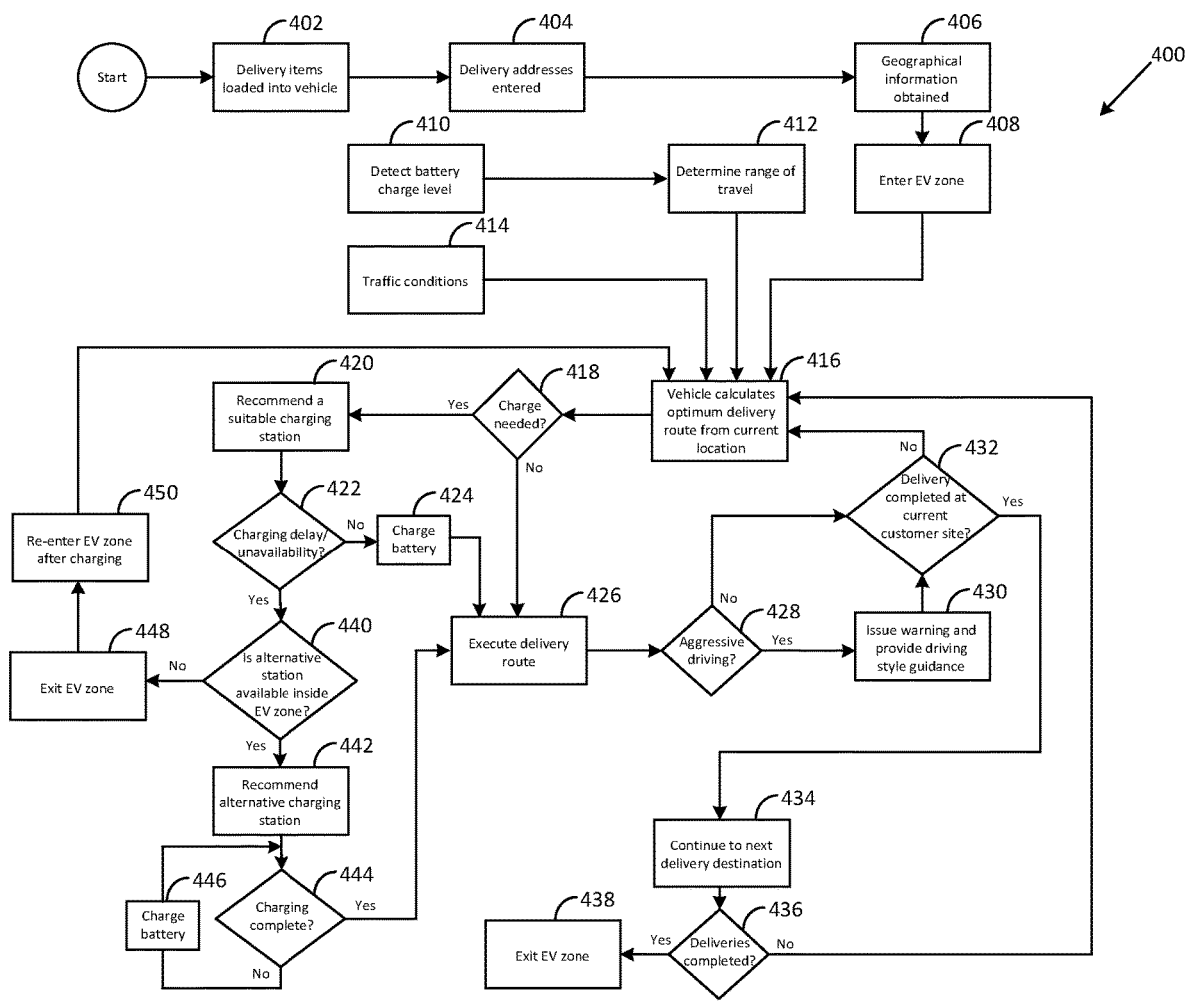
FIG. 4 shows an exemplary flowchart of a method to execute a delivery route by a hybrid-electric vehicle inside an emissions-free zone in accordance with the disclosure.

FIG. 4 shows an exemplary flowchart 400 of a method to execute a delivery route by the hybrid-electric vehicle 105 inside an emissions-free zone 130 in accordance with the disclosure. The exemplary flowchart 400 illustrates a sequence of operations that can be implemented in hardware, software, or a combination thereof. In the context of software, the operations represent computer-executable instructions stored on one or more non-transitory computer-readable media such as the memory 315, that, when executed by one or more processors such as the processor 310, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the exemplary flowchart 400 may be carried out by using an application stored in the memory 315 and executed by the processor 310 of the travel route optimization system 110.

The exemplary scenario illustrated in FIG. 2 will be used for purposes of describing some of the operations included in the flowchart 400. At block 402, the hybrid-electric vehicle 105 is loaded with articles that are to be delivered to various customer sites along a travel route such as the travel route 233. At block 404, a list of the various delivery addresses is entered into the travel route optimization system 110. In one exemplary implementation, the list of delivery addresses may be entered into the travel route optimization system 110 by the driver 106 prior to starting out on the delivery route which includes traveling inside the emissions-free zone 130. The travel route optimization system 110 may be a software application that is loaded onto a smartphone carried by the driver 106.

At block 406, the travel route optimization system 110 can use the map information database 321 to obtain geographical information about an area in which the delivery route is located. The map information database 321 can be updated automatically or manually if the geographical information is not currently available in the map information database 321. The automatic update can be carried out by the travel route optimization system 110 communicating with a suitable information source such as Google Maps®.

At block 408, the driver 106 drives the hybrid-electric vehicle 105 into the emissions-free zone 130. At block 410, the processor 310 of the computer 305 in the travel route optimization system 110 may execute the battery charge level detection module 316 in order to detect a charge level in one or more batteries of the hybrid-electric vehicle 105. At block 412, the processor 310 determines a range of travel of the hybrid-electric vehicle 105 based on the detected charge level. At block 414, the current traffic conditions inside some or all areas of the emissions-free zone 130 are determined. This operation may be carried out by accessing the traffic information database 322, which may be updated in real-time by the processor 310 communicating with a traffic monitoring service that provides traffic reports and/or accident reports.

At block 416, the processor 310 may execute the travel route generation module 317 to generate the optimized travel route 233 for use by the hybrid-electric vehicle 105 inside the emissions-free zone 130. The optimized travel route 233 can originate from a current location of the hybrid-electric vehicle 105 such as the location 232 inside the emissions-free zone 130. Execution of the travel route generation module 317 for generating the optimized travel route 233 can include the use of information such as the current location of the hybrid-electric vehicle 105, the range of travel attainable by the hybrid-electric vehicle 105 (operation indicated in block 412), and current traffic conditions (operation indicated in block 414). Information obtained from other sources such as the charging station information database 319 and the emissions-free zone information database 323 may also be used to generate the optimized travel route 233.

At block 418, a determination is made whether one or more batteries of the hybrid-electric vehicle 105 need charging. If no charging is required, the driver 106 can execute the optimized travel route (block 426). For example, if the range of travel of the hybrid-electric vehicle 105 as identified in block 412 is equal to 50 miles and the travel route through the emissions-free zone 130 is less than 50 miles (25 miles for example), the hybrid-electric vehicle 105 can be driven through the emissions-free zone 130 without the risk of starting the gasoline engine.

On the other hand, if the batteries of the hybrid-electric vehicle 105 require recharging, at block 420, the travel route optimization system 110 recommends the use of a charging station located nearest to the current location of the hybrid-electric vehicle 105. The charging station may be identified by the travel route optimization system 110 by using information obtained from the charging station information database 319 and the emissions-free zone information database 323, for example. The charging station may be also identified by the travel route optimization system 110 based on other factors such as a time of day (for example, around a lunch break of the driver 106) or a facility (for example, close to a restaurant favored by the driver 106).

At block 422, a determination can be made if there are any adverse factors associated with using the charging station. If no adverse factors exist, at block 424, the batteries of the hybrid-electric vehicle 105 are charged, and the hybrid-electric vehicle 105 proceeds to execute the optimized delivery route (block 426). On the other hand, some adverse factors may be present in the use of the charging station. For example, the charging station information database 319 provides pricing information for using the charging station.

The driver 106 may find the price unacceptable and decide not to travel to the charging station. As another example, the driver 106 may discover upon reaching the charging station that all of the charging units are in use and an unacceptably long delay would occur if the hybrid-electric vehicle 105 had to wait at that charging station.

Consequently, at block 440, a determination is made to identify an alternative charging station that is present inside the emissions-free zone 130. If no alternative charging station is present inside the emissions-free zone 130, at block 448, the driver 106 is advised by the travel route optimization system 110 to exit the emissions-free zone 130. Directions to do so may be provided. At block 450, the hybrid-electric vehicle 105 re-enters the emissions-free zone 130 after battery charging, and a fresh optimal route map is generated (block 416) by the processor 310 followed by operations indicated in subsequent blocks.

If an alternative charging station is available, at block 442, the travel route optimization system 110 recommends the use of the alternative charging station. Directions to travel to the alternative charging station may be provided by the travel route optimization system 110 to guide the driver 106 to the alternative charging station.

At block 444, a determination is made on whether charging of the batteries of the hybrid-electric vehicle 105 at the alternative charging station has been completed. If not completed, at block 446, charging of the batteries is continued. If charging of the batteries of the hybrid-electric vehicle 105 at the alternative charging station is completed, at block 426, the driver 106 drives the hybrid-electric vehicle 105 along the optimized travel route inside the emissions-free zone 130.

At block 428, a determination is made on whether the driver 106 is driving aggressively. The determination can be made by using the sensor system 335 to identify various driving characteristics such as a speed at which the hybrid-electric vehicle 105 is being driven, abrupt acceleration, and/or sudden braking, which would be indicative of improper driving (in the form of tail-gating and excessive lane changes, for example). The sensor system 335 may also be used to identify excessive battery drain which would indicate that the driver 106 is driving in an improper manner. At block 430, a warning and/or advisory is provided to the driver 106 by the travel route optimization system 110. The warning may, for example, advise the driver 106 to slow down.

At block 432, a determination is made on whether delivery has been completed at a first customer site. If delivery has not been completed, for example, due to an unexpected delay, the travel route optimization system 110 may recalculate the optimized travel route (block 416) followed by subsequent operations indicated in other blocks. If delivery has been completed at the first customer site, at block 434, the travel route optimization system 110 advises the driver 106 to follow the optimized travel route to the next customer site.

At block 436, a determination is made on whether all deliveries inside the emissions-free zone 130 have been completed. If completed, the travel route optimization system 110 advises the driver 106 to exit the emissions-free zone 130 (block 438). If some more deliveries have to be made, the travel route optimization system 110 may recalculate the optimized travel route (block 416) followed by subsequent operations indicated in other blocks.

Figure 5:
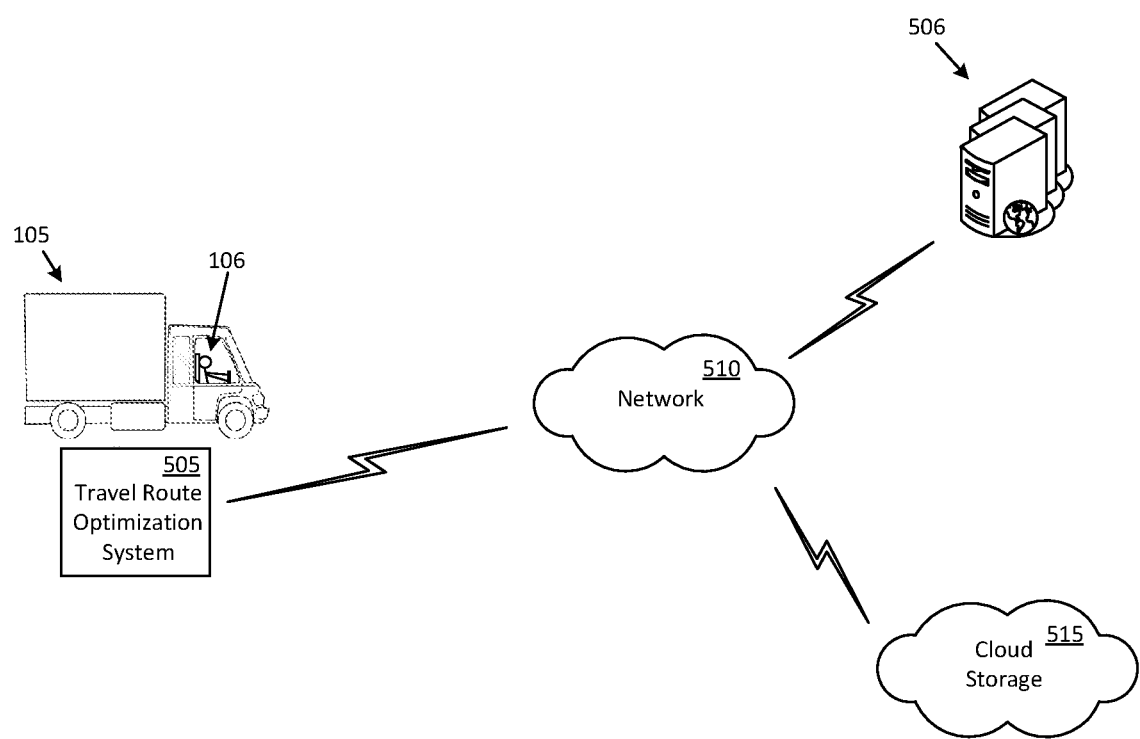
FIG. 5 shows an exemplary embodiment of a travel route optimization system in accordance with the disclosure.

FIG. 5 shows an exemplary embodiment of the travel route optimization system 505 in accordance with the disclosure. In one exemplary implementation of this embodiment, some of the components of the computer 305 of the travel route optimization system 505 can be incorporated into a server system 506 that is communicatively coupled to the travel route optimization system 505 through a network 510. For example, some or all parts of the travel route generation module 317 can be provided in the server system 506 in lieu of, or to complement, the one provided in the computer 305. In this exemplary implementation, the server system 506 can execute the travel route generation module 317 independently or in cooperation with the computer 305.

In another exemplary implementation of the embodiment, at least some of the contents of the memory 315, such as the map information database 321, the traffic information database 322, the emissions-free zone information database 323, and/or the charging station information database 319 can be partly or completely located in a cloud storage system 515 and/or the server system 506. The cloud storage system 515 may be communicatively coupled to the travel route optimization system 505 through the network 510. The network 510 may include any one or a combination of various networks such as a local area network (LAN), a wide area network (WAN), a telephone network, a cellular network, a cable network, a wireless network, and/or private/public networks such as the Internet.

In the context of hardware, memory devices such as the memory 315 that is a part of the computer 305 in the travel route optimization system 110, can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers such as the computer 305 may be implemented by computer-executable instructions stored on one or more non-transitory computer-readable media such as the memory 315, that, when executed by one or more processors such as the processor 310, perform the recited operations. Generally, computer-executable instructions include routines, programs, objects, components, data structures, and the like that perform particular functions or implement particular abstract data types.

Example Embodiments

In some instances, the following examples may be implemented together or separately by the systems and methods described herein.

Example 1 may include a method comprising: determining, by a first computer, a first charge level in at least one battery of a hybrid-electric vehicle; identifying, by the first computer, a location of one or more charging stations inside an emissions-free zone; and generating, by the first computer, a travel route of the hybrid-electric vehicle inside the emissions-free zone based at least in part on the first charge level and the location of the one or more charging stations inside the emissions-free zone.

Example 2 may include the method of example 1, wherein the travel route is optimized to eliminate operating a gasoline engine of the hybrid-electric vehicle inside the emissions-free zone.

Example 3 may include the method of example 1 and/or some other example herein, wherein the one or more charging stations include a first charging station that is reachable by the hybrid-electric vehicle by using the at least one battery having the first charge level.

Example 4 may include the method of example 3 and/or some other example herein, further comprising: identifying, by a driver of the hybrid-electric vehicle, upon reaching the first charging station, that the first charging station is unavailable; entering, into the first computer, by the driver of the hybrid-electric vehicle, a request to modify the travel route; and generating, by the first computer, a modified travel route based at least in part on a second charge level in the at least one battery of the hybrid-electric vehicle at the first charging station.

Example 5 may include the method of example 4 and/or some other example herein, further comprises: determining, by the first computer, whether the hybrid-electric vehicle can reach a second charging station inside the emissions-free zone by using the at least one battery having the second charge level; providing, by the first computer, to the driver of the hybrid-electric vehicle, upon determining that the second charging station is reachable by using the at least one battery having the second charge level, a recommendation to drive to the second charging station; and providing, by the first computer, to the driver of the hybrid-electric vehicle, upon determining that the second charging station is unreachable by using the at least one battery having the second charge level, a recommendation to drive to a third charging station located outside the emissions-free zone.

Example 6 may include the method of example 3 and/or some other example herein, further comprising: identifying, by the first computer, an inability of the hybrid-electric vehicle to reach the first charging station due to one or more travel factors; and generating, by the first computer, based at least in part on the one or more travel factors, a modified travel route to one of a second charging station located inside the emissions-free zone or a third charging station located outside the emissions-free zone.

Example 7 may include the method of example 6 and/or some other example herein, wherein the one or more travel factors include at least one of a traffic delay or an inability of the hybrid-electric vehicle to reach the second charging station by using the battery having the first charge level.

Example 8 may include a method comprising: determining, by a first computer, a travel route for a hybrid-electric vehicle inside an emissions-free zone; and modifying, by the first computer, the travel route based at least in part on a charge level in one or more batteries of the hybrid-electric vehicle and one or more charging stations located in at least one of the emissions-free zone or outside the emissions-free zone.

Example 9 may include the method of example 8, wherein modifying the travel route is executed in real-time by the first computer.

Example 10 may include the method of example 8 and/or some other example herein, wherein the travel route is a delivery route for delivering products to a set of customers inside the emissions-free zone.

Example 11 may include the method of example 10 and/or some other example herein, further comprising: identifying a location of at least one charging station inside the emissions-free zone based at least in part on the delivery route.

Example 12 may include the method of example 11 and/or some other example herein, wherein identifying the location of the at least one charging station inside the emissions-free zone is carried out at least in further part based on a delivery sequence along the delivery route.

Example 13 may include the method of example 11 and/or some other example herein, wherein identifying the location of the at least one charging station inside the emissions-free zone is carried out at least in further part based on the charge level in the one or more batteries of the hybrid-electric vehicle.

Example 14 may include the method of example 8 and/or some other example herein, further comprising: determining, by the first computer, an entry point for the hybrid-electric vehicle into the emissions-free zone, based at least in part on the location of the one or more charging stations and a first charge level of at least one battery in the hybrid-electric vehicle.

Example 15 may include a travel route generation system comprising: at least one memory that stores computer-executable instructions; and at least one processor configured to access the at least one memory and execute the computer-executable instructions to at least: determine a travel route for a hybrid-electric vehicle inside an emissions-free zone; and modify the travel route based at least in part on a charge level in one or more batteries of the hybrid-electric vehicle and one or more charging stations located in at least one of the emissions-free zone or outside the emissions-free zone.

Example 16 may include the system of example 15, wherein modifying the travel route is executed in real-time by the at least one processor.

Example 17 may include the system of example 15 and/or some other example herein, wherein the travel route is a delivery route for delivering products to a set of customers inside the emissions-free zone.

Example 18 may include the system of example 17 and/or some other example herein, wherein the at least one processor is configured to access the at least one memory and execute additional computer-executable instructions to at least: identify a location of at least one charging station inside the emissions-free zone based at least in part on the delivery route.

Example 19 may include the system of example 17 and/or some other example herein, wherein identifying the location of the at least one charging station inside the emissions-free zone is carried out at least in further part based on a delivery sequence along the delivery route.

Example 20 may include the system of example 17 and/or some other example herein, wherein identifying the location of the at least one charging station inside the emissions-free zone is carried out at least in further part based on a charge storage capacity of one or more batteries in the hybrid-electric vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining, by a first computer, a first charge level in at least one battery of a hybrid-electric vehicle;
   identifying, by the first computer, a location of a first charging station inside an emissions-free zone, wherein use of an internal combustion engine of the hybrid-electric vehicle is restricted within the emissions-free zone;
   determining, based on the first charge level and while the hybrid-electric vehicle is inside the emissions-free zone, that the hybrid-electric vehicle is unable to travel to the first charging station within the emissions-free zone using the battery; and
   generating, by the first computer and based on the determination that the hybrid-electric vehicle is unable to travel to the first charging station within the emissions-free zone using the battery, a travel route of the hybrid-electric vehicle, the travel route navigating the hybrid-electric vehicle to a second charging station located outside of the emissions-free zone.

2. The method of claim 1, wherein the travel route is optimized to eliminate operating a gasoline engine of the hybrid-electric vehicle inside the emissions-free zone.

3. The method of claim 1, wherein the one or more charging stations include a first charging station that is reachable by the hybrid-electric vehicle by using the at least one battery having the first charge level.

4. The method of claim 3, further comprising:
   identifying, by a driver of the hybrid-electric vehicle, upon reaching the first charging station, that the first charging station is unavailable;
   entering, into the first computer, by the driver of the hybrid-electric vehicle, a request to modify the travel route; and
   generating, by the first computer, a modified travel route based at least in part on a second charge level in the at least one battery of the hybrid-electric vehicle at the first charging station.

5. The method of claim 4, further comprises:
   determining, by the first computer, whether the hybrid-electric vehicle can reach a second charging station inside the emissions-free zone by using the at least one battery having the second charge level;
   providing, by the first computer, to the driver of the hybrid-electric vehicle, upon determining that the second charging station is reachable by using the at least one battery having the second charge level, a recommendation to drive to the second charging station; and
   providing, by the first computer, to the driver of the hybrid-electric vehicle, upon determining that the second charging station is unreachable by using the at least one battery having the second charge level, a recommendation to drive to a third charging station located outside the emissions-free zone.

6. The method of claim 3, further comprising:
   identifying, by the first computer, an inability of the hybrid-electric vehicle to reach the first charging station due to one or more travel factors; and
   generating, by the first computer, based at least in part on the one or more travel factors, a modified travel route to one of a second charging station located inside the emissions-free zone or a third charging station located outside the emissions-free zone.

7. The method of claim 6, wherein the one or more travel factors include at least one of a traffic delay or an inability of the hybrid-electric vehicle to reach the second charging station by using the battery having the first charge level.

8. A method comprising:
   determining a delivery route for a hybrid-electric vehicle, a location of a first charging station inside an emissions-free zone, wherein use of an internal combustion engine of the hybrid-electric vehicle is restricted within the emissions-free zone;
   determining a charge level of a battery of the hybrid-electric vehicle;
   determining, based on the charge level of the hybrid-electric vehicle and the delivery route of the hybrid electric vehicle, that the hybrid-electric vehicle is unable to travel to the first charging station within the emissions-free zone using the battery;
   modifying, based on the determination that the hybrid-electric vehicle is unable to travel to charging station within the emissions-free zone using the battery, the delivery route to a second delivery route to route the hybrid-electric vehicle outside of the emissions-free zone;
   determining a second charge level in at least one battery of a second hybrid-electric vehicle; and
   determining, based on the second charge level, a third delivery route for the second hybrid-electric vehicle, the third delivery route being the same as the first delivery route.

9. The method of claim 8, wherein modifying the travel route is executed in real time.

10. The method of claim 8, wherein the travel route is a delivery route for delivering products to a set of customers inside the emissions-free zone.

11. The method of claim 10, further comprising:
    identifying a location of at least one charging station inside the emissions-free zone based at least in part on the delivery route.

12. The method of claim 11, wherein identifying the location of the at least one charging station inside the emissions-free zone is carried out at least in further part based on a delivery sequence along the delivery route.

13. The method of claim 11, wherein identifying the location of the at least one charging station inside the emissions-free zone is carried out at least in further part based on the charge level in the battery of the hybrid-electric vehicle.

14. The method of claim 8, further comprising:
    determining an entry point for the hybrid-electric vehicle into the emissions-free zone, based at least in part on the location of the one or more charging stations and a first charge level of at least one battery in the hybrid-electric vehicle.

15. A travel route generation system comprising:
    at least one memory that stores computer-executable instructions; and
    at least one processor configured to access the at least one memory and execute the computer-executable instructions to at least:
    determine a delivery route for a hybrid-electric vehicle, a location of a first charging station inside an emissions-free zone, wherein use of an internal combustion engine of the hybrid-electric vehicle is restricted within the emissions-free zone;
    determine a charge level of a battery of the hybrid-electric vehicle;
    determine, based on the charge level of the battery of the hybrid-electric vehicle and the delivery route of the hybrid electric vehicle, that the hybrid-electric vehicle is unable to travel to the first charging station within the emissions-free zone using the battery;

modify, based on the determination that the hybrid-electric vehicle is unable to travel to the first charging station within the emissions-free zone using the battery, the delivery route to a second delivery route to route the hybrid-electric vehicle outside of the emissions-free zone;

determine a second charge level in at least one battery of a second hybrid-electric vehicle; and determine, based on the second charge level, a third delivery route for the second hybrid-electric vehicle, the third delivery route being the same as the delivery route.

16. The system of claim 15, wherein modifying the travel route is executed in real-time by the at least one processor.

17. The system of claim 15, wherein the travel route is a delivery route for delivering products to a set of customers inside the emissions-free zone.

18. The system of claim 17, wherein the at least one processor is configured to access the at least one memory and execute additional computer-executable instructions to at least:

identify a location of at least one charging station inside the emissions-free zone based at least in part on the delivery route.

19. The system of claim 17, wherein identifying the location of the at least one charging station inside the emissions-free zone is carried out at least in further part based on a delivery sequence along the delivery route.

20. The system of claim 17, wherein identifying the location of the at least one charging station inside the emissions-free zone is carried out at least in further part based on a charge storage capacity of one or more batteries in the hybrid-electric vehicle.

\* \* \* \* \*